United States Patent
Lin et al.

(10) Patent No.: US 12,273,135 B2
(45) Date of Patent: Apr. 8, 2025

(54) RADIO FREQUENCY RECEIVING DEVICE WITH AUTOMATIC GAIN CONTROL AND SIGNAL PROCESSING METHOD THEREOF

(71) Applicant: TRANS ELECTRIC CO., LTD., Changhua County (TW)

(72) Inventors: Mao-Jung Lin, Changhua County (TW); Ching-Yuan Wang, Changhua County (TW); Tzu-Ming Wang, Changhua County (TW)

(73) Assignee: TRANS ELECTRIC CO., LTD., Changhua County (TW)

( * ) Notice: Subject to any disclaimer, the term of this patent is extended or adjusted under 35 U.S.C. 154(b) by 352 days.

(21) Appl. No.: 17/817,008

(22) Filed: Aug. 3, 2022

(65) Prior Publication Data
US 2023/0070530 A1 Mar. 9, 2023

(30) Foreign Application Priority Data
Sep. 3, 2021 (TW) .................. 110132943

(51) Int. Cl.
H04B 1/16 (2006.01)
G08B 5/36 (2006.01)

(52) U.S. Cl.
CPC .................. *H04B 1/16* (2013.01); *G08B 5/36* (2013.01)

(58) Field of Classification Search
CPC .................. H04B 1/16; G08B 5/36
See application file for complete search history.

(56) References Cited

U.S. PATENT DOCUMENTS 6,389,070 B1 * 5/2002 Cugnini .................. H04N 5/211 375/228
2020/0404251 A1 * 12/2020 Tinaphong .......... H04N 17/004

FOREIGN PATENT DOCUMENTS

| CN | 104639081 A | 5/2015 |
| CN | 204905447 U | 12/2015 |
| EP | 0692885 A1 | 1/1996 |
| TW | 200826552 A | 6/2008 |
| WO | WO-8606238 W * | 4/1986 .......... H04N 7/0882 |

* cited by examiner

*Primary Examiner* — Sam K Ahn
*Assistant Examiner* — Amneet Singh
(74) *Attorney, Agent, or Firm* — CKC & Partners Co., LLC

(57) ABSTRACT

A radio frequency receiving device with automatic gain control includes a filtering module, a radio frequency processing module, a controlling unit and a displaying unit. The filtering module is configured to filter a radio frequency signal to generate a filtered signal. The radio frequency processing module includes an amplifier, a detecting circuit and an automatic gain control circuit. The amplifier amplifies the filtered signal to generate a radio frequency output signal. The detecting circuit detects the filter signal to generate a detected signal. The controlling unit generates at least one intensity signal according to the detected signal, and judges the detected signal to generate an automatic gain control signal. The automatic gain control circuit controls the radio frequency output signal according to the automatic gain control signal. The displaying unit turns on or off a plurality of light emitters according to the at least one intensity signal.

14 Claims, 14 Drawing Sheets

RADIO FREQUENCY RECEIVING DEVICE WITH AUTOMATIC GAIN CONTROL AND SIGNAL PROCESSING METHOD THEREOF

RELATED APPLICATIONS

This application claims priority to Taiwan Application Serial Number 110132943 filed on Sep. 3, 2021, which is herein incorporated by reference.

BACKGROUND

Technical Field

The present disclosure relates to a radio frequency receiving device and a signal processing method thereof. More particularly, the present disclosure relates to a radio frequency receiving device with automatic gain control and a signal processing method thereof.

Description of Related Art

In recent years, due to the promotion of the wireless digital television, users only need to install an antenna and configure a media playing device to receive a wireless television signal via the antenna to watch high definition television programs.

A conventional analog television broadcast can receive the picture while adjusting the antenna to obtain optimal reception. However, terrestrial digital television broadcasting cannot use this simple method. In the face of the lack of reception of terrestrial digital television broadcasting, it is impossible to achieve optimal reception.

A conventional solution of terrestrial digital television broadcasting is to add the display of the signal level detection of the received wireless television signal to the antenna. In the hardware implementation, a diode detection is used to realize the display of the signal level detection. Although the cost of the conventional solution is low, it has poor sensitivity and insufficient dynamic range. In addition, the wireless television signal having excessive signal strength may cause distortion of the media played by the media playing device. Therefore, a radio frequency receiving device with automatic gain control and a signal processing method thereof having the features of high sensitivity, high dynamic range and high gain without a signal overload problem are commercially desirable.

SUMMARY

According to one aspect of the present disclosure, a radio frequency receiving device with automatic gain control includes a filtering module, a radio frequency processing module, a controlling unit and a displaying unit. The filtering module is configured to filter a radio frequency signal to generate a filtered signal. The radio frequency processing module includes an amplifier, a detecting circuit and an automatic gain control circuit. The amplifier is electrically connected to the filtering module and receives the filtered signal. The amplifier amplifies the filtered signal to generate a radio frequency output signal. The detecting circuit is electrically connected to the filtering module and receives the filtered signal. The detecting circuit detects the filter signal to generate a detected signal. The automatic gain control circuit is electrically connected to the amplifier. The controlling unit is electrically connected to the detecting circuit and the automatic gain control circuit and receives the detected signal. The controlling unit generates at least one intensity signal according to the detected signal, and judges the detected signal to generate an automatic gain control signal. The displaying unit is electrically connected to the controlling unit and includes a plurality of light emitters. The controlling unit transmits the automatic gain control signal to the automatic gain control circuit, so that the automatic gain control circuit controls the radio frequency output signal of the amplifier according to the automatic gain control signal. The controlling unit transmits the at least one intensity signal to the displaying unit, so that the displaying unit turns on or off the light emitters according to the at least one intensity signal.

According to another aspect of the present disclosure, a signal processing method of a radio frequency receiving device with automatic gain control includes performing a filtering step, an amplifying step, a detecting step, an operation controlling step, an automatic gain controlling step and a displaying step. The filtering step is performed to configure a filtering module to filter a radio frequency signal to generate a filtered signal. The amplifying step is performed to configure an amplifier to amplify the filtered signal to generate a radio frequency output signal. The detecting step is performed to configure a detecting circuit to detect the filter signal to generate a detected signal. The operation controlling step is performed to configure a controlling unit to judge the detected signal to generate an automatic gain control signal, and generate at least one intensity signal according to the detected signal. The automatic gain controlling step is performed to configure an automatic gain control circuit to control the radio frequency output signal of the amplifier according to the automatic gain control signal. The displaying step is performed to configure a displaying unit to turn on or off a plurality of light emitters according to the at least one intensity signal.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
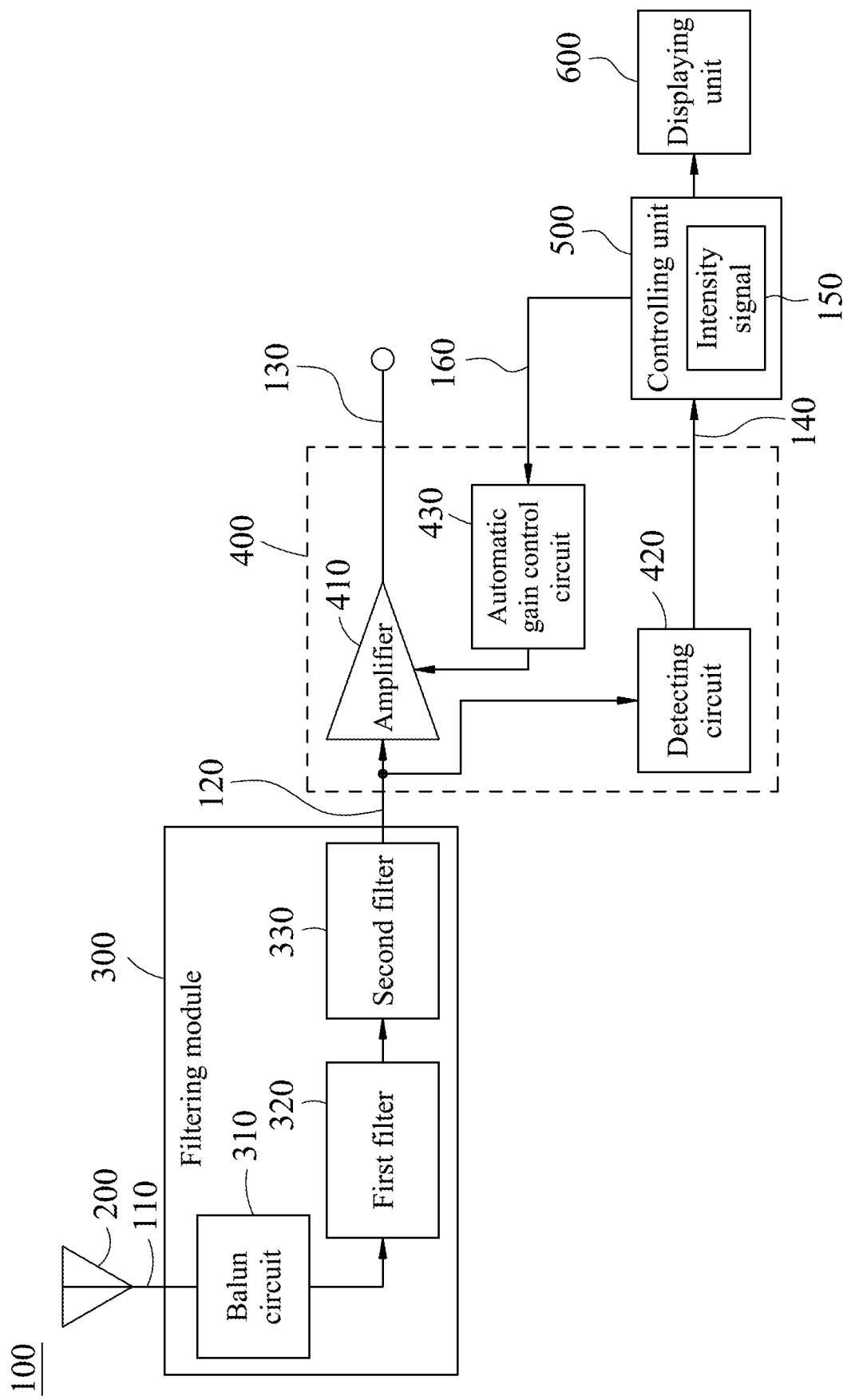
FIG. 1 shows a block diagram of a radio frequency receiving device with automatic gain control according to a first embodiment of the present disclosure.

FIG. 1 shows a block diagram of a radio frequency receiving device 100 with Automatic Gain Control (AGC) according to a first embodiment of the present disclosure. The radio frequency receiving device 100 with automatic gain control includes an antenna 200, a filtering module 300, a radio frequency processing module 400, a controlling unit 500 and a displaying unit 600. The antenna 200 is electrically connected to the filtering module 300. The filtering module 300 is configured to filter a radio frequency signal 110 to generate a filtered signal 120. The filtering module 300 includes a balun circuit 310, a first filter 320 and a second filter 330. The balun circuit 310 is configured to match the radio frequency signal 110 and is connected between the antenna 200 and the first filter 320. The second filter 330 is connected between the first filter 320 and the radio frequency processing module 400. In one embodiment, the first filter 320 may be a band stop filter (FM Trap Filter, 88 MHz-108 MHz), and the second filter 330 may be a low pass filter (700 MHz), but the present disclosure is not limited thereto. The radio frequency processing module 400 includes an amplifier 410, a detecting circuit 420 and an automatic gain control circuit 430. The amplifier 410 is electrically connected to the filtering module 300 and receives the filtered signal 120. The amplifier 410 amplifies the filtered signal 120 to generate a radio frequency output signal 130. The detecting circuit 420 is electrically connected to the filtering module 300 and receives the filtered signal 120. The detecting circuit 420 detects the filtered signal 120 to generate a detected signal 140. The automatic gain control circuit 430 is electrically connected to the amplifier 410. The controlling unit 500 is electrically connected to the detecting circuit 420 and the automatic gain control circuit 430, and receives the detected signal 140. The controlling unit 500 converts the detected signal 140 into at least one intensity signal 150. In other words, the controlling unit 500 generates the at least one intensity signal 150 according to the detected signal 140, and judges the detected signal 140 to generate an automatic gain control signal 160. The displaying unit 600 is electrically connected to the controlling unit 500 and includes a plurality of light emitters. The controlling unit 500 transmits the automatic gain control signal 160 to the automatic gain control circuit 430, so that the automatic gain control circuit 430 controls the radio frequency output signal 130 of the amplifier 410 according to the automatic gain control signal 160. The controlling unit 500 transmits the at least one intensity signal 150 to the displaying unit 600, so that the displaying unit 600 turns on or off the light emitters according to the at least one intensity signal 150. Therefore, the radio frequency receiving device 100 with automatic gain control of the present disclosure can improve the sensitivity and dynamic range of the display of the signal level detection by automatic gain control, and control the radio frequency output signal 130 at an appropriate level. The present disclosure utilizes the radio frequency processing module 400 including the automatic gain control circuit 430 to avoid a signal overload problem of a conventional radio frequency receiving device. In addition, the radio frequency receiving device 100 with automatic gain control of the present disclosure has high sensitivity, high dynamic range and high gain, thus greatly improving the convenience and success rate of reception of terrestrial digital television broadcasting.

Figure 2:
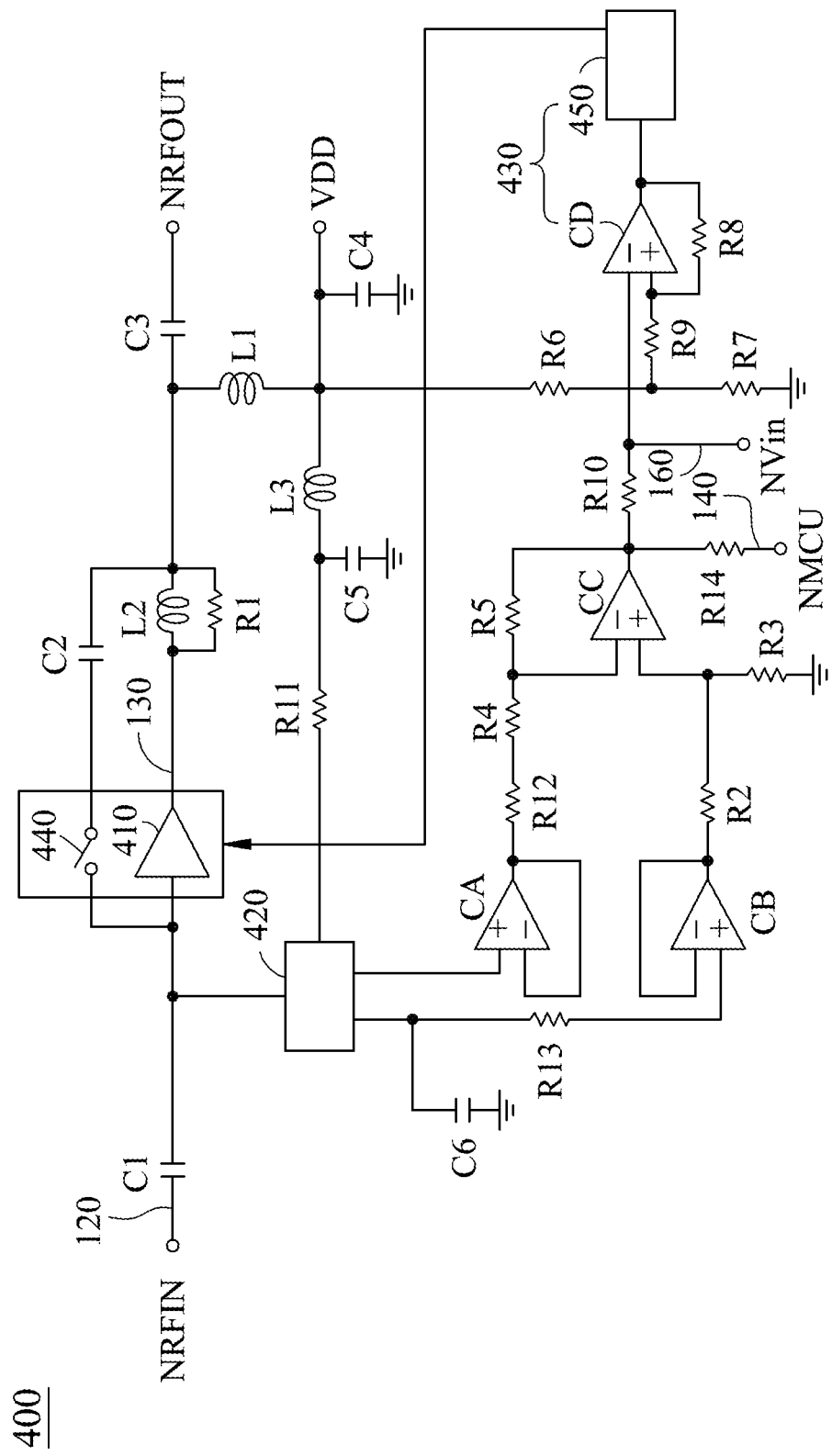
FIG. 2 shows a circuit diagram of a radio frequency processing module of FIG. 1.

Please refer to FIGS. 1 and 2. FIG. 2 shows a circuit diagram of the radio frequency processing module 400 of FIG. 1. The radio frequency processing module 400 includes the amplifier 410, the detecting circuit 420, the automatic gain control circuit 430, a switch 440, a first capacitor C1, a second capacitor C2, a third capacitor C3, a fourth capacitor C4, a fifth capacitor C5, a sixth capacitor C6, a first inductor L1, a second inductor L2, a third inductor L3, a first resistor R1, a second resistor R2, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a twelfth resistor R12, a thirteenth resistor R13, a fourteenth resistor R14, a first comparator CA, a second comparator CB, a third comparator CC, an automatic gain control input node NVin, a control output node NMCU, a radio frequency input node NRFIN and a radio frequency output node NRFOUT. The amplifier 410 is electrically connected to the detecting circuit 420, the first capacitor C1, the switch 440, the second inductor L2 and the first resistor R1. The detecting circuit 420 is electrically connected to the first capacitor C1, the switch 440, the sixth capacitor C6, the thirteenth resistor R13, the first comparator CA and the eleventh resistor R11. The automatic gain control circuit 430 includes a fourth comparator CD and a logic circuit 450, and is electrically connected to the amplifier 410 and the switch 440. The switch 440 is electrically connected between the first capacitor C1 and the second capacitor C2. The switch 440 is electrically connected between an input terminal and an output terminal of the amplifier 410. The switch 440 is turned on or off according to the automatic gain control signal 160, so that the filtered signal 120 is passed through one of the switch 440 and the amplifier 410. The logic circuit 450 is electrically connected to the fourth comparator CD, and converts a comparison output signal of the fourth comparator CD into a digital control signal to control the operation of the amplifier 410 and the switch 440. The second capacitor C2 is electrically connected to the first resistor R1, the second inductor L2, the third capacitor C3 and the first inductor L1. The first resistor R1 and the second inductor L2 are electrically connected to the output terminal of the amplifier 410. The first capacitor C1 is electrically connected between the radio frequency input node NRFIN and the amplifier 410. The third capacitor C3 is electrically connected between the amplifier 410 and the radio frequency output node NRFOUT. The fourth capacitor C4 is electrically connected between a power supply voltage VDD and a ground voltage (GND). The fifth capacitor C5 is electrically connected to the eleventh resistor R11 and the third inductor L3. The first inductor L1 is electrically connected to the fourth capacitor C4, the third inductor L3 and the sixth resistor R6. The second resistor R2 is electrically connected to the second comparator CB, the third resistor R3 and the third comparator CC. The fourth resistor R4 is electrically connected to the fifth resistor R5 and the third comparator CC. The fifth resistor R5 is electrically connected to the tenth resistor R10 and the fourteenth resistor R14. The seventh resistor R7 is electrically connected to the sixth resistor R6 and the ninth resistor R9. The eighth resistor R8 is electrically connected to the ninth resistor R9, the fourth comparator CD and the logic circuit 450. The tenth resistor R10 is electrically connected between the automatic gain control input node NVin and the control output node NMCU. The twelfth resistor R12 is electrically connected between the first comparator CA and the fourth resistor R4. The fourteenth resistor R14 is electrically connected between the third comparator CC and the control output node NMCU. The second comparator CB is electrically connected between the second resistor R2 and the thirteenth resistor R13. Each of the automatic gain control input node NVin and the control output node NMCU is electrically connected to the controlling unit 500.

Figure 3:
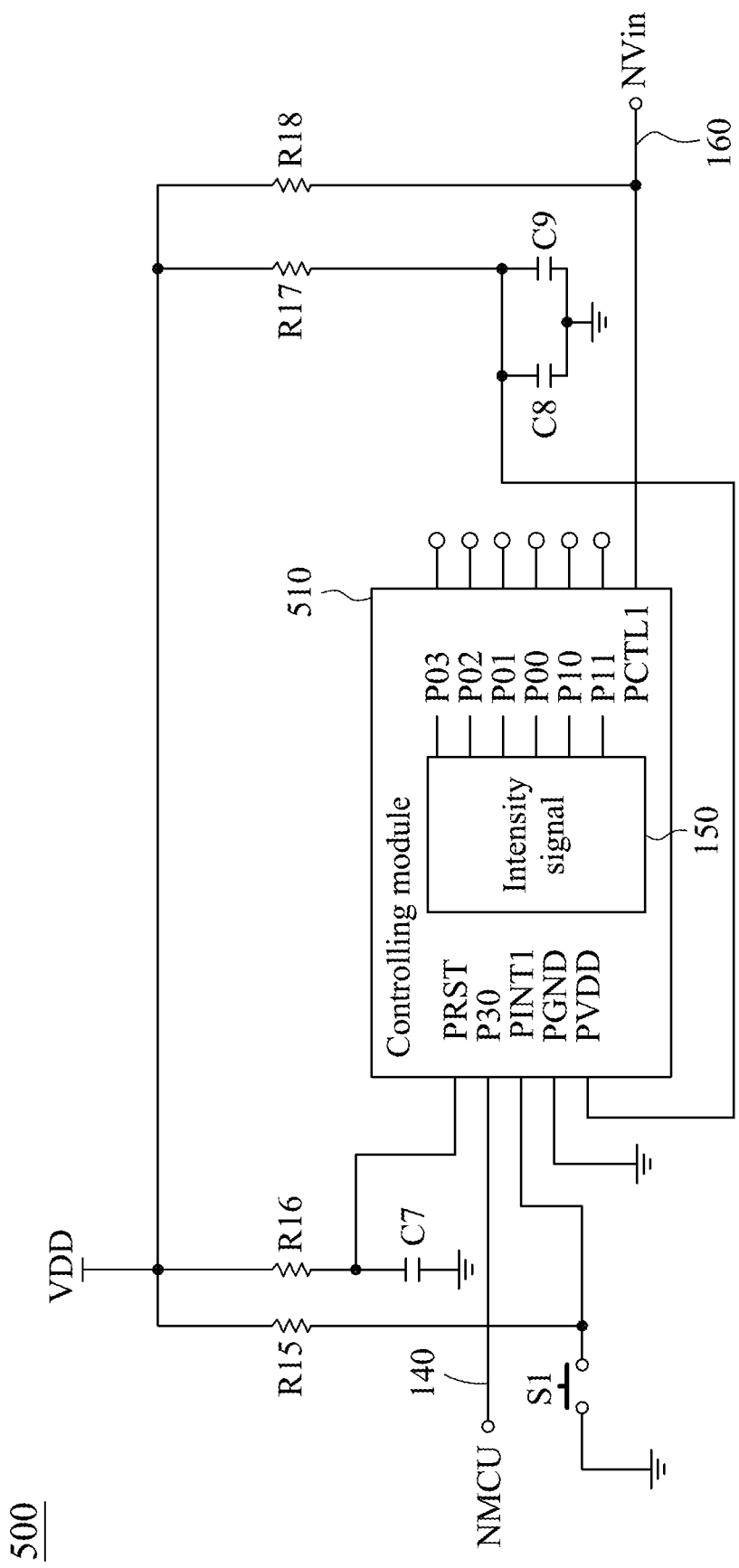
FIG. 3 shows a circuit diagram of a controlling unit of FIG. 1.

Please refer to FIGS. 1, 2 and 3. FIG. 3 shows a circuit diagram of the controlling unit 500 of FIG. 1. The controlling unit 500 includes a controlling module 510, an interrupt switch S1, a fifteenth resistor R15, a sixteenth resistor R16, a seventeenth resistor R17, an eighteenth resistor R18, a seventh capacitor C7, an eighth capacitor C8 and a ninth capacitor C9. The controlling module 510 includes a plurality of connecting ports PRST, P30, PINT1, PGND, PVDD, PCTL1, P00, P01, P02, P03, P10, P11 and an intensity signal 150. The connecting port PRST is electrically connected to the sixteenth resistor R16 and the seventh capacitor C7. The connecting port P30 is electrically connected to the control output node NMCU of the radio frequency processing module 400. The connecting port PINT1 is electrically connected to the interrupt switch S1 and the fifteenth resistor R15. The connecting port PGND is electrically connected to the ground voltage. The connecting port PVDD is electrically connected to the eighth capacitor C8, the ninth capacitor C9 and the seventeenth resistor R17. The connecting port PCTL1 is electrically connected to the automatic gain control input node NVin and the eighteenth resistor R18. The connecting ports P00, P01, P02, P03, P10, P11 are electrically connected to the displaying unit 600. The intensity signal 150 corresponds to the signals of the connecting ports P00, P01, P02, P03, P10, P11. The fifteenth resistor R15, the sixteenth resistor R16, the seventeenth resistor R17 and the eighteenth resistor R18 are all connected to the power supply voltage VDD. Therefore, the controlling unit 500 converts the detected signal 140 of the control output node NMCU into the intensity signal 150, and judges the detected signal 140 to generate the automatic gain control signal 160. Moreover, the controlling unit 500 transmits the intensity signal 150 to the displaying unit 600, and transmits the automatic gain control signal 160 to the automatic gain control circuit 430 via the automatic gain control input node NVin. The automatic gain control circuit 430 controls the radio frequency output signal 130 of the amplifier 410 according to the automatic gain control signal 160, thereby controlling the signal of the radio frequency output node NRFOUT.

Figure 4:
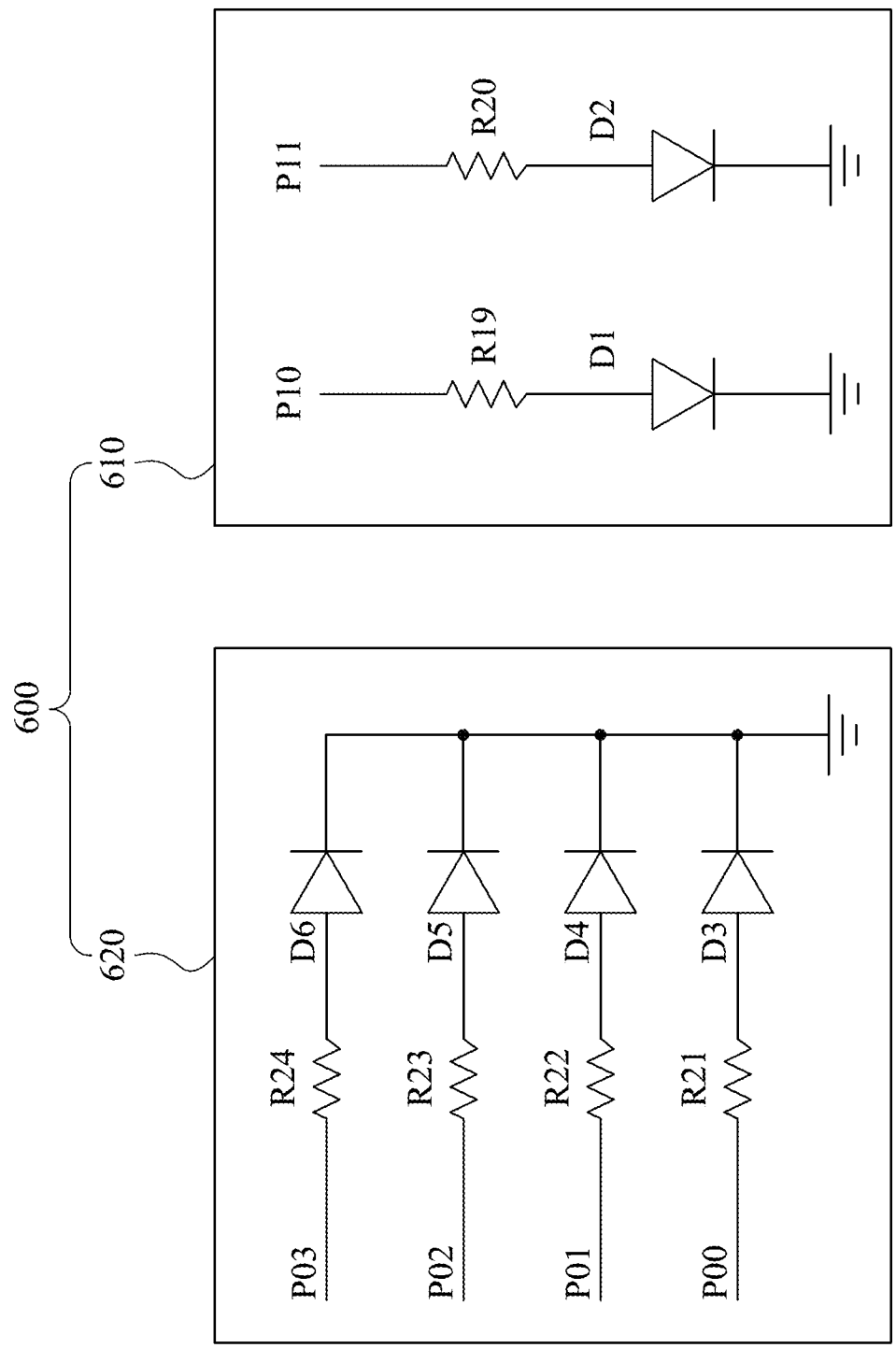
FIG. 4 shows a circuit diagram of a displaying unit of FIG. 1.

Please refer to FIGS. 1, 2, 3 and 4. FIG. 4 shows a circuit diagram of the displaying unit 600 of FIG. 1. The displaying unit 600 includes a first displaying module 610 and a second displaying module 620. The first displaying module 610 includes a first light emitting element D1, a second light emitting element D2 and a plurality of resistors R19, R20. The first light emitting element D1 and the second light emitting element D2 are electrically connected to the controlling unit 500 via the resistor R19 and the resistor R20, respectively. The resistor R19 is electrically connected between the connecting port P10 and the first light emitting element D1. The resistor R20 is electrically connected between the connecting port P11 and the second light emitting element D2. The controlling unit 500 judges whether the detected signal 140 is greater than a predetermined detection threshold to generate the automatic gain control signal 160. In response to determining that the detected signal 140 is greater than the predetermined detection threshold, the automatic gain control signal 160 is a high voltage level. In response to determining that the detected signal 140 is smaller than or equal to the predetermined detection threshold, the automatic gain control signal 160 is a low voltage level. The low voltage level is smaller than the high voltage level. In addition, the controlling unit 500 simultaneously turns on or off the first light emitting element D1 and the second light emitting element D2 according to the automatic gain control signal 160. In response to determining that the automatic gain control signal 160 is the high voltage level, the first light emitting element D1 is turned off, and the second light emitting element D2 is turned on. In response to determining that the automatic gain control signal 160 is the low voltage level, the first light emitting element D1 is turned on, and the second light emitting element D2 is turned off. In other words, only one of the first light emitting element D1 and the second light emitting element D2 is turned on at the same time. When the first light emitting element D1 is turned on, it represents "without automatic gain control". When the second light emitting element D2 is turned on, it represents "with automatic gain control". In one embodiment, the first light emitting element D1 which is turned on can emit a white light. The second light emitting element D2 which is turned on can emit a blue light, but the present disclosure is not limited thereto.

Furthermore, the second displaying module 620 includes a first light emitter D3, a second light emitter D4, a third light emitter D5, a fourth light emitter D6 and a plurality of resistors R21, R22, R23, R24. The resistor R21 is electrically connected between the connecting port P00 and the first light emitter D3. The resistor R22 is electrically connected between the connecting port P01 and the second light emitter D4. The resistor R23 is electrically connected between the connecting port P02 and the third light emitter D5. The resistor R24 is electrically connected between the connecting port P03 and the fourth light emitter D6. The controlling unit 500 judges whether an intensity value of the at least one intensity signal 150 is within one of a plurality of value intervals. In response to determining that the intensity value of the at least one intensity signal 150 is within the one of the value intervals, at least one of the light emitters (e.g., the first light emitter D3, the second light emitter D4, the third light emitter D5 and the fourth light emitter D6) is turned on. In detail, the value intervals include a first value interval, a second value interval, a third value interval and a fourth value interval. Values from small to large are the first value interval, the second value interval, the third value interval and the fourth value interval in sequence. In response to determining that the intensity value of the at least one intensity signal 150 is within the first value interval, the first light emitter D3 is turned on, and the second light emitter D4, the third light emitter D5 and the fourth light emitter D6 are turned off. In response to determining that the intensity value of the at least one intensity signal 150 is within the second value interval, the first light emitter D3 and the second light emitter D4 are turned on, and the third light emitter D5 and the fourth light emitter D6 are turned off. In response to determining that the intensity value of the at least one intensity signal 150 is within the third value interval, the first light emitter D3, the second light emitter D4 and the third light emitter D5 are turned on, and the fourth light emitter D6 is turned off. In response to determining that the intensity value of the at least one intensity signal 150 is within the fourth value interval, the first light emitter D3, the second light emitter D4, the third light emitter D5 and the fourth light emitter D6 are turned on. The number of the light emitters and the resistors of the present disclosure can be adjusted according to requirements, and the present disclosure is not limited thereto.

Figure 5:
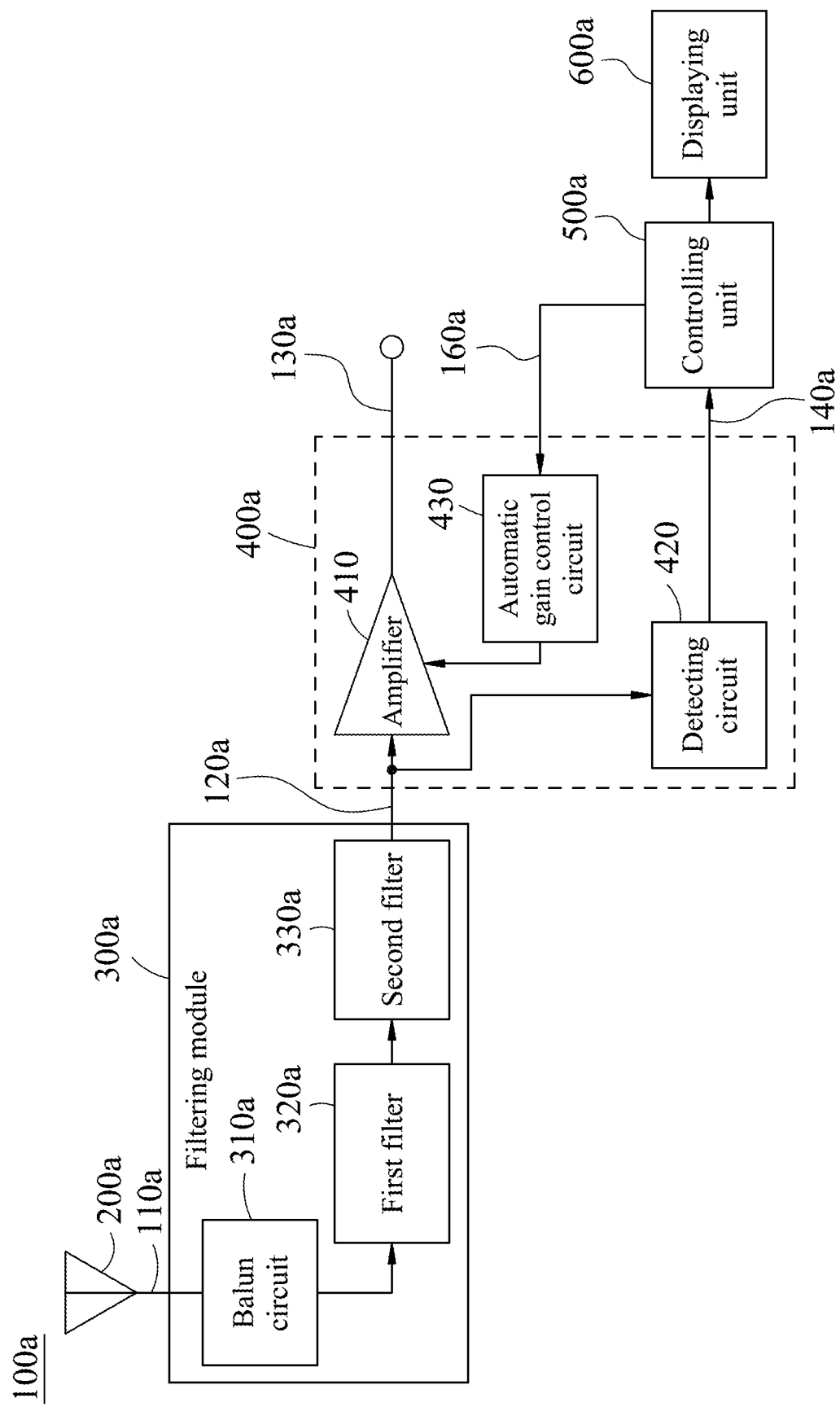
FIG. 5 shows a block diagram of a radio frequency receiving device with automatic gain control according to a second embodiment of the present disclosure.
Figure 6:
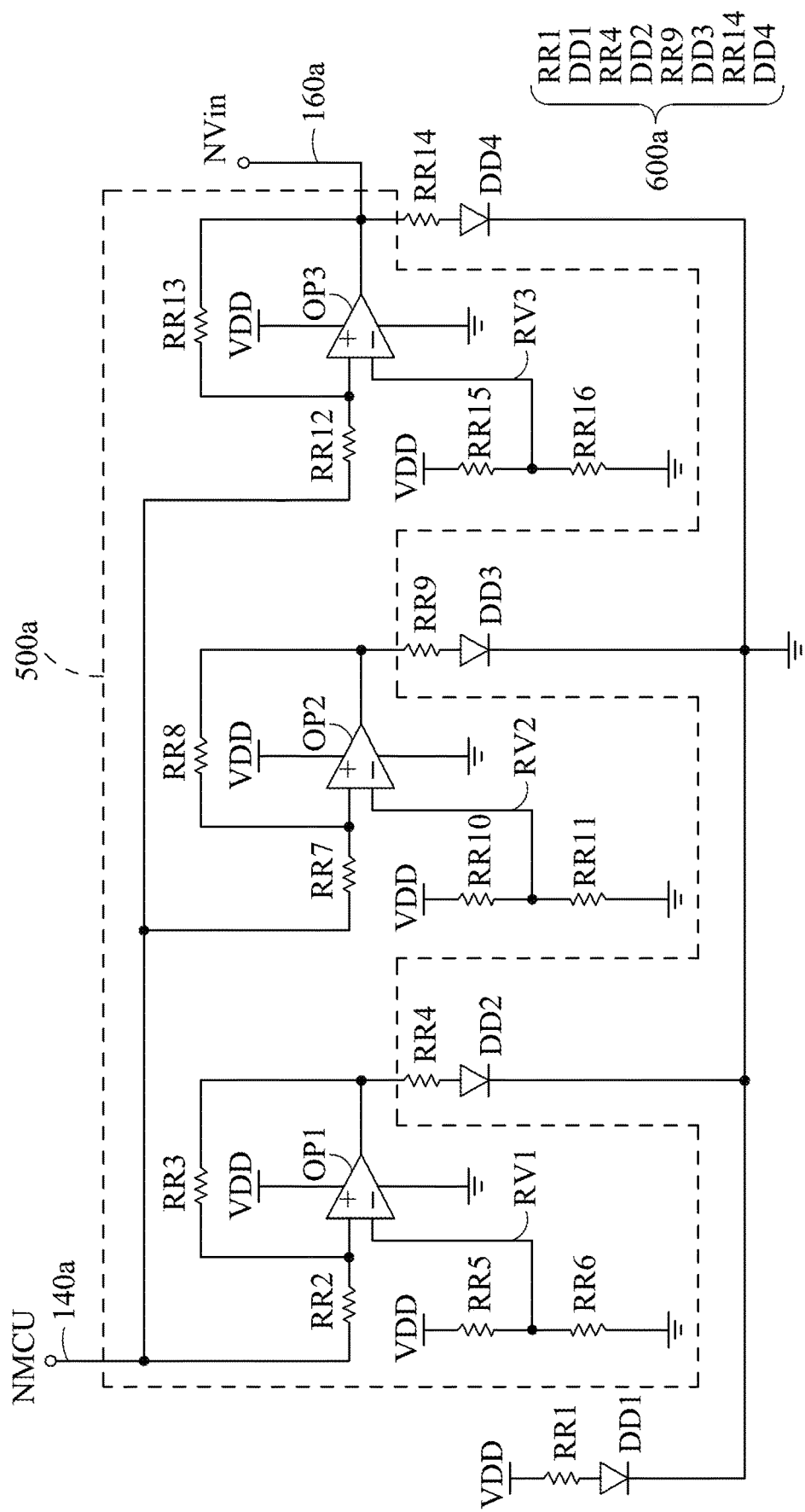
FIG. 6 shows a circuit diagram of a controlling unit and a displaying unit of FIG. 5.

Please refer to FIGS. 1, 5 and 6. FIG. 5 shows a block diagram of a radio frequency receiving device 100a with automatic gain control according to a second embodiment of the present disclosure. FIG. 6 shows a circuit diagram of a controlling unit 500a and a displaying unit 600a of FIG. 5. The radio frequency receiving device 100a with automatic gain control includes an antenna 200a, a filtering module 300a, a radio frequency processing module 400a, the controlling unit 500a and the displaying unit 600a. The antenna 200a is electrically connected to the filtering module 300a. The filtering module 300a is configured to filter a radio frequency signal 110a to generate a filtered signal 120a. The filtering module 300a includes a balun circuit 310a, a first filter 320a and a second filter 330a. The balun circuit 310a is configured to match the radio frequency signal 110a and is connected between the antenna 200a and the first filter 320a. The second filter 330a is connected between the first filter 320a and the radio frequency processing module 400a. In one embodiment, the first filter 320a may be a high pass filter (174 MHz-230 MHz), and the second filter 330a may be a low pass filter (608 MHz), but the present disclosure is not limited thereto. The radio frequency processing module 400a includes an amplifier 410, a detecting circuit 420 and an automatic gain control circuit 430. The structure of the radio frequency processing module 400a is the same as the structure of the radio frequency processing module 400 of FIG. 1. The controlling unit 500a is electrically connected to the detecting circuit 420 and the automatic gain control circuit 430, and receives a detected signal 140a. The controlling unit 500a compares the detected signal 140a with a plurality of reference voltages RV1, RV2, RV3 to generate the intensity signals, and one of the intensity signals is an automatic gain control signal 160a. The displaying unit 600a is electrically connected to the controlling unit 500a and includes a plurality of light emitters DD1, DD2, DD3, DD4.

The controlling unit 500a transmits the automatic gain control signal 160a to the automatic gain control circuit 430, so that the automatic gain control circuit 430 controls the radio frequency output signal 130a of the amplifier 410 according to the automatic gain control signal 160a. The controlling unit 500a transmits the intensity signals to the displaying unit 600a, so that the displaying unit 600a turns on or off the light emitters DD2, DD3, DD4 according to the intensity signals. Therefore, the radio frequency receiving device 100a with automatic gain control of the present disclosure can improve the sensitivity and dynamic range of the display of the signal level detection by automatic gain control, and control the radio frequency output signal 130a at an appropriate level, and avoid a signal overload problem of a conventional radio frequency receiving device. Moreover, the controlling unit 500a including the operational amplifiers OP1, OP2, OP3 can simultaneously generate the automatic gain control signal 160a and the intensity signals to realize the adjustment of the radio frequency output signal 130a and the intensity display of the radio frequency signal 110a, respectively. In addition, the radio frequency receiving device 100a with automatic gain control of the present disclosure has high sensitivity, high dynamic range and high gain, thus greatly improving the convenience and success rate of reception of terrestrial digital television broadcasting.

In detail, the controlling unit 500a judges whether the detected signal 140a is greater than one of the reference voltages RV1, RV2, RV3 (i.e., the reference voltage RV3) to generate the automatic gain control signal 160a. In response to determining that the detected signal 140a is greater than the one of the reference voltages RV1, RV2, RV3, the automatic gain control signal 160a is a high voltage level. In response to determining that the detected signal 140a is smaller than or equal to the one of the reference voltages RV1, RV2, RV3, the automatic gain control signal 160a is a low voltage level. The low voltage level is smaller than the high voltage level. The controlling unit 500a includes a plurality of operational amplifiers OP1, OP2, OP3 and a plurality of resistors RR2, RR3, RR5, RR6, RR7, RR8, RR10, RR11, RR12, RR13, RR15, RR16. The operational amplifiers OP1, OP2, OP3 are electrically connected to the detecting circuit 420 and receive the detected signal 140a. One of the operational amplifiers OP1, OP2, OP3 (i.e., the operational amplifier OP3) is electrically connected to the automatic gain control circuit 430. The operational amplifiers OP1, OP2, OP3 are electrically connected to the light emitters DD2, DD3, DD4, respectively. Each of the operational amplifiers OP1, OP2, OP3 compares the detected signal 140a with each of the reference voltages RV1, RV2, RV3 to generate each of the intensity signals, so that the light emitters DD2, DD3, DD4 are turned on or off according to the intensity signals, respectively.

The displaying unit 600a further includes a plurality of resistors RR1, RR4, RR9, RR14. The resistor RR1 is electrically connected between the light emitter DD1 and the power supply voltage VDD. The resistor RR4 is electrically connected between the light emitter DD2 and the operational amplifier OP1. The resistor RR9 is electrically connected between the light emitter DD3 and the operational amplifier OP2. The resistor RR14 is electrically connected between the light emitter DD4 and the operational amplifier OP3. In addition, the controlling unit 500a judges whether a plurality of intensity values of the intensity signals is within one of a plurality of value intervals. In response to determining that the intensity values of the intensity signals is within the one of the value intervals, at least one of the light emitters DD1, DD2, DD3, DD4 is turned on. The value intervals include a first value interval, a second value interval, a third value interval and a fourth value interval. Values from small to large are the first value interval, the second value interval, the third value interval and the fourth value interval in sequence. In response to determining that the intensity values of the intensity signals is within the first value interval (e.g., the intensity values of the intensity signals outputted by the operational amplifiers OP1, OP2, OP3 are 0, 0, 0, respectively), the light emitter DD1 is turned on, and the light emitters DD2, DD3, DD4 are turned off. In response to determining that the intensity values of the intensity signals is within the second value interval (e.g., the intensity values of the intensity signals outputted by the operational amplifiers OP1, OP2, OP3 are 1, 0, 0, respectively), the light emitters DD1, DD2 are turned on, and the light emitters DD3, DD4 are turned off. In response to determining that the intensity values of the intensity signals is within the third value interval (e.g., the intensity values of the intensity signals outputted by the operational amplifiers OP1, OP2, OP3 are 1, 1, 0, respectively), the light emitters DD1, DD2, DD3 are turned on, and the light emitter DD4 is turned off. In response to determining that the intensity values of the intensity signals is within the fourth value interval (e.g., the intensity values of the intensity signals outputted by the operational amplifiers OP1, OP2, OP3 are 1, 1, 1, respectively), the light emitters DD1, DD2, DD3, DD4 are all turned on. The number of the operational amplifiers, the light emitters and the resistors of the present disclosure can be adjusted according to requirements, and the present disclosure is not limited thereto.

Figure 7:
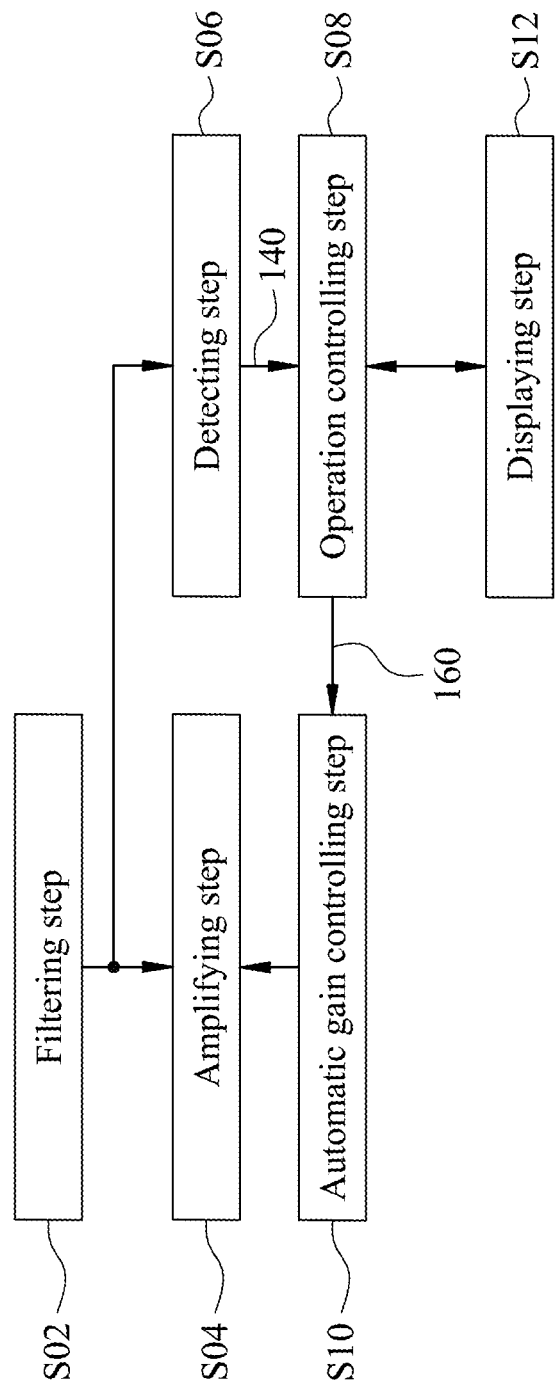
FIG. 7 shows a flow chart of a signal processing method of a radio frequency receiving device with automatic gain control according to a third embodiment of the present disclosure.

Please refer to FIGS. 1 and 7. FIG. 7 shows a flow chart of a signal processing method 700 of a radio frequency receiving device 100 with automatic gain control according to a third embodiment of the present disclosure. The signal processing method 700 of the radio frequency receiving device 100 with automatic gain control includes performing a filtering step S02, an amplifying step S04, a detecting step S06, an operation controlling step S08, an automatic gain controlling step S10 and a displaying step S12. The filtering step S02 is performed to configure a filtering module 300 to filter a radio frequency signal 110 to generate a filtered signal 120. The amplifying step S04 is performed to configure an amplifier 410 to amplify the filtered signal 120 to generate a radio frequency output signal 130. The detecting step S06 is performed to configure a detecting circuit 420 to detect the filtered signal 120 to generate a detected signal 140. The operation controlling step S08 is performed to configure a controlling unit 500 to judge the detected signal 140 to generate an automatic gain control signal 160, and generate at least one intensity signal 150 according to the detected signal 140. The automatic gain controlling step S10 is performed to configure an automatic gain control circuit 430 to control the radio frequency output signal 130 of the amplifier 410 according to the automatic gain control signal 160. The displaying step S12 is performed to configure a displaying unit 600 to turn on or off a plurality of light emitters according to the at least one intensity signal 150. Therefore, the signal processing method 700 of the radio frequency receiving device 100 with automatic gain control of the present disclosure can improve the sensitivity and dynamic range of the display of the signal level detection by automatic gain control, and control the radio frequency output signal 130 at an appropriate level, and avoid a signal overload problem of a conventional radio frequency receiving device. Moreover, the operation controlling step S08 can simultaneously generate the automatic gain control signal 160 and the at least one intensity signal 150 to realize the adjustment of the radio frequency output signal 130 and the intensity display of the radio frequency signal 110, respectively. In addition, the signal processing method 700 of the present disclosure can process the radio frequency signal 110 by the radio frequency receiving device 100 with high sensitivity, high dynamic range and high gain, thus greatly improving the convenience and success rate of reception of terrestrial digital television broadcasting.

Figure 8:
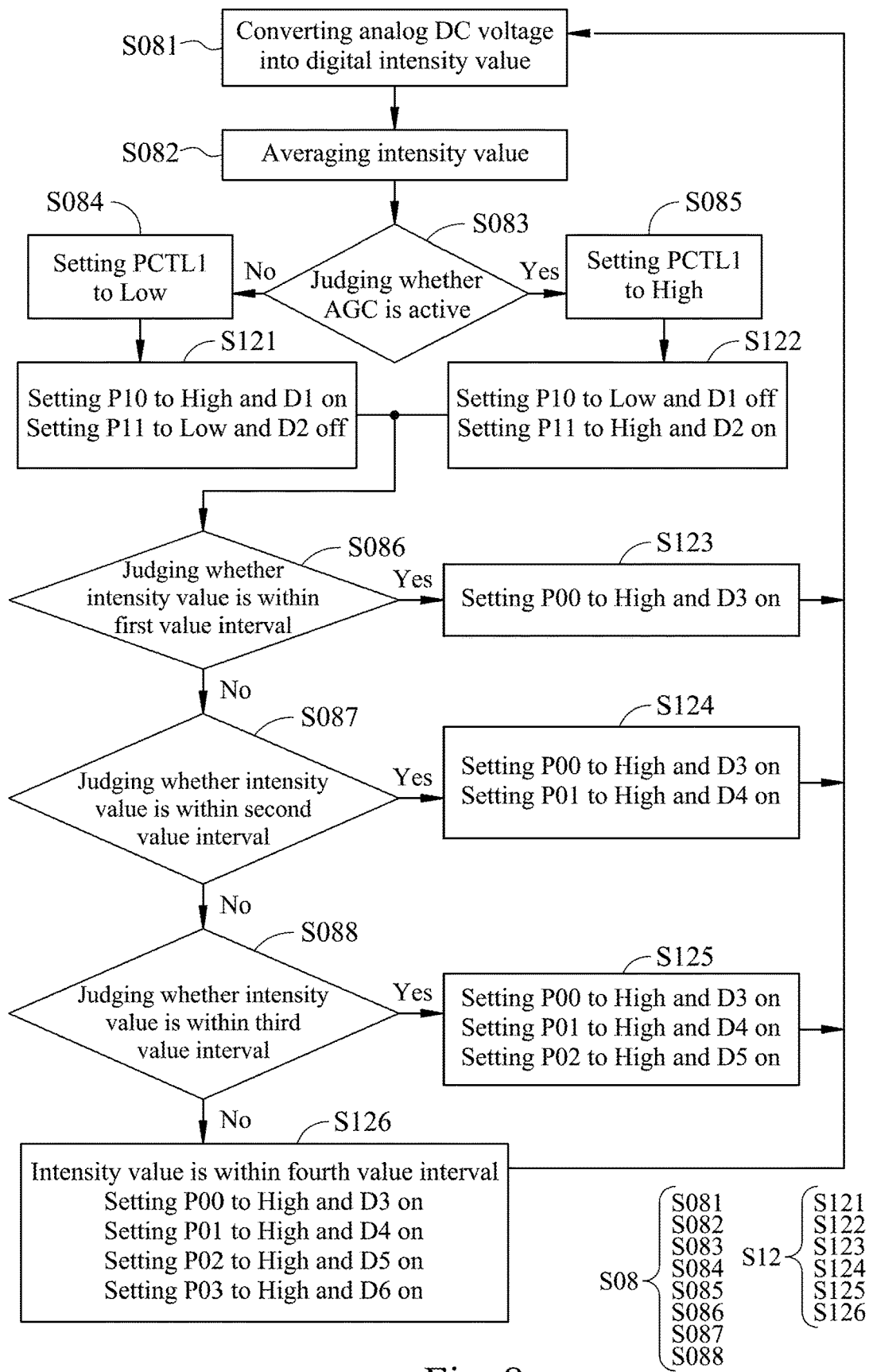
FIG. 8 shows a schematic view of an operation controlling step and a displaying step of FIG. 7.

Please refer to FIGS. 1, 3, 4, 7 and 8. FIG. 8 shows a schematic view of the operation controlling step S08 and the displaying step S12 of FIG. 7. The operation controlling step S08 includes performing a plurality of steps S081, S082, S083, S084, S085, S086, S087, S088. The step S081 is "Converting analog DC voltage into digital intensity value", and represents that converting an analog DC voltage of the detected signal 140 into a digital intensity value (i.e., the intensity value in a digital form) of the at least one intensity signal 150. The step S082 is "Averaging intensity value", and represents that averaging the intensity value of the at least one intensity signal 150. The step S083 is "Judging whether AGC is active", and represents that determining whether the automatic gain control is active. If the automatic gain control is not active, performing the steps S084, S121. If the automatic gain control is active, performing the steps S085, S122. The step S084 is "Setting PCTL1 to Low", and represents that setting the connecting port PCTL1 to the low voltage level. The step S085 is "Setting PCTL1 to High", and represents that setting the connecting port PCTL1 to the high voltage level. The step S086 is "Judging whether intensity value is within first value interval", and represents that judging whether the intensity value is within the first value interval. If the intensity value is not within the first value interval, performing the step S087. If the intensity value is within the first value interval, performing the step S123. The step S087 is "Judging whether intensity value is within second value interval", and represents that judging whether the intensity value is within the second value interval. If the intensity value is not within the second value interval, performing the step S088. If the intensity value is within the second value interval, performing the step S124. The step S088 is "Judging whether intensity value is within third value interval", and represents that judging whether the intensity value is within the third value interval. If the intensity value is not within the third value interval, performing the S126. If the intensity value is within the third value interval, performing the step S125.

The displaying step S12 includes performing a plurality of steps S121, S122, S123, S124, S125, S126. The step S121 is "Setting P10 to High and D1 on" and "Setting P11 to Low and D2 off", and represents that setting the connecting port P10 to the high voltage level to turn on the first light emitting element D1, and setting the connecting port P11 to the low voltage level to turn off the second light emitting element D2. The step S122 is "Setting P10 to Low and D1 off" and "Setting P11 to High and D2 on", and represents that setting the connecting port P10 to the low voltage level to turn off the first light emitting element D1, and setting the connecting port P11 to the high voltage level to turn on the second light emitting element D2. The step S123 is "Setting P00 to High and D3 on", and represents that setting the connecting port P00 to the high voltage level to turn on the first light emitter D3. The step S124 is "Setting P00 to High and D3 on" and "Setting P01 to High and D4 on", and represents that setting the connecting ports P00, P01 to the high voltage level to turn on the first light emitter D3 and the second light emitter D4. The step S125 is "Setting P00 to High and D3 on", "Setting P01 to High and D4 on" and "Setting P02 to High and D5 on", and represents that setting the connecting ports P00, P01, P02 to the high voltage level to turn on the first light emitter D3, the second light emitter D4 and the third light emitter D5. The step S126 is "Intensity value is within fourth value interval", "Setting P00 to High and D3 on", "Setting P01 to High and D4 on", "Setting P02 to High and D5 on" and "Setting P03 to High and D6 on", and represents that setting the connecting ports P00, P01, P02, P03 to the high voltage level to turn on the first light emitter D3, the second light emitter D4, the third light emitter D5 and the fourth light emitter D6. In the step S083 of the operation controlling step S08, the controlling unit 500 judges whether the detected signal 140 is greater than a predetermined detection threshold to generate the automatic gain control signal 160. In response to determining that the detected signal 140 is greater than the predetermined detection threshold, the automatic gain control signal 160 is the high voltage level, such as the step S085. In response to determining that the detected signal 140 is smaller than or equal to the predetermined detection threshold, the automatic gain control signal 160 is the low voltage level, such as the step S084. In addition, in response to determining that the detected signal 140 is greater than the predetermined detection threshold, the controlling unit 500 enables the displaying unit 600 to correspondingly display the status of the radio frequency output signal 130 according to the intensity value of the at least one intensity signal 150.

It is worth mentioning that the signal processing method 700 of FIG. 7 can also be applied to the radio frequency receiving device 100a with automatic gain control of FIG. 5. The controlling unit 500a including the operational amplifiers OP1, OP2, OP3 can simultaneously generate the automatic gain control signal 160a and the intensity signals to realize the adjustment of the radio frequency output signal 130a and the intensity display of the radio frequency signal 110a, respectively.

Figure 9:
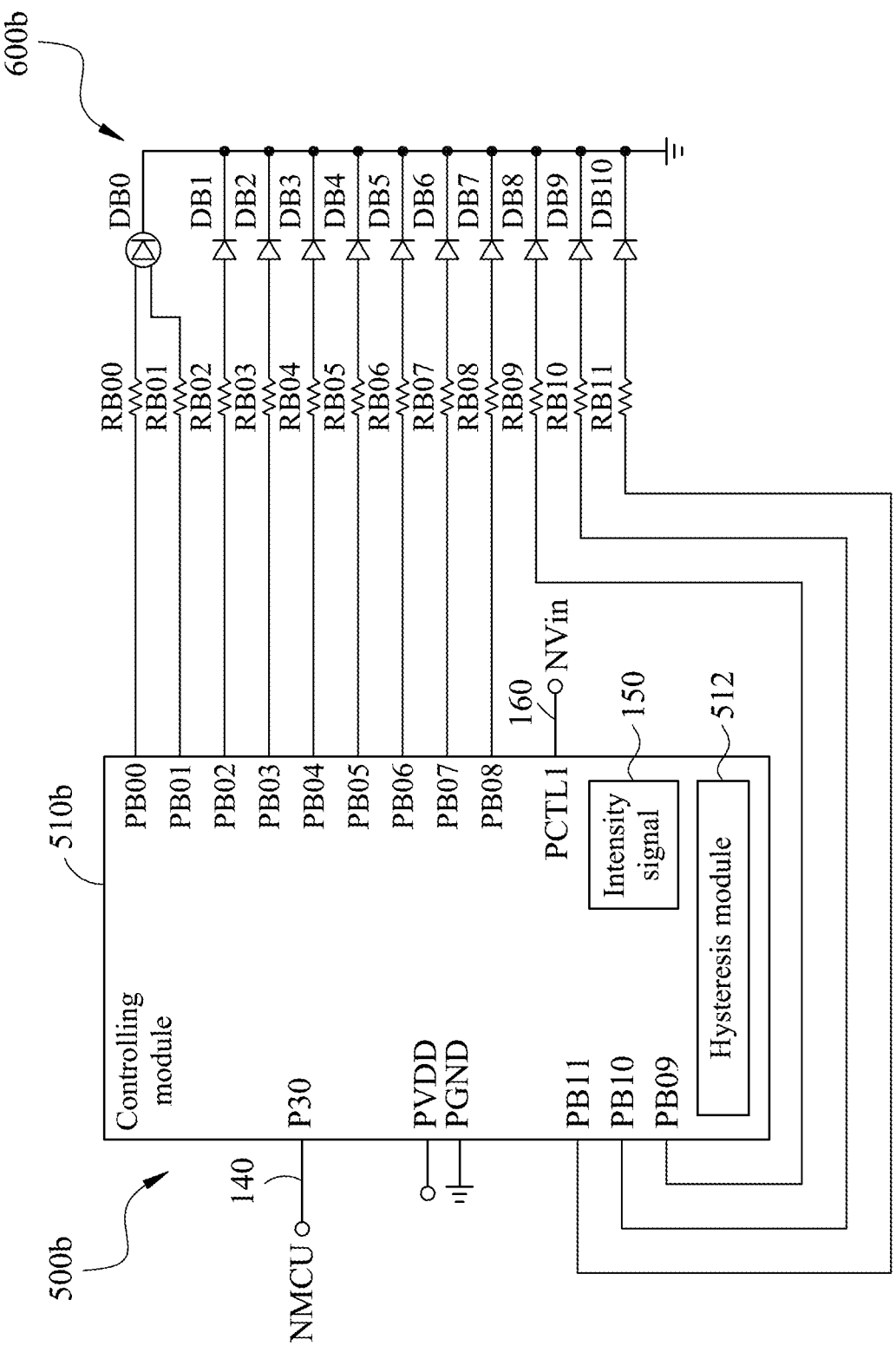
FIG. 9 shows a schematic view of a controlling unit and a displaying unit of a radio frequency receiving device with automatic gain control according to a fourth embodiment of the present disclosure.
Figure 10:
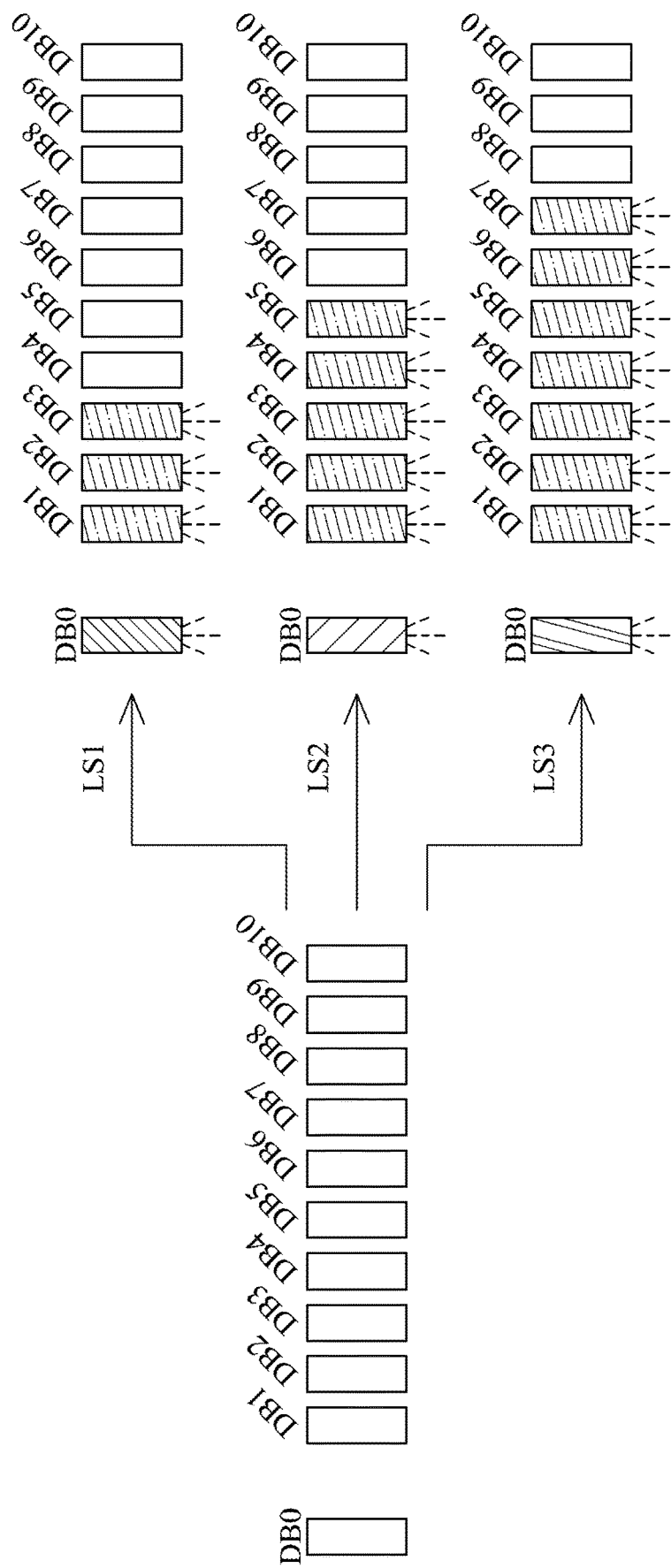
FIG. 10 shows a schematic view of a plurality of lighting statuses of the displaying unit of FIG. 9.

Please refer to FIGS. 1, 2, 9 and 10. FIG. 9 shows a schematic view of a controlling unit 500b and a displaying unit 600b of a radio frequency receiving device with automatic gain control according to a fourth embodiment of the present disclosure. FIG. 10 shows a schematic view of a plurality of lighting statuses LS1, LS2, LS3 of the displaying unit 600b of FIG. 9. The controlling unit 500b is connected to the radio frequency processing module 400 and includes a controlling module 510b. The controlling module 510b includes a plurality of connecting ports P30, PGND, PVDD, PCTL1, PB00, PB01, PB02, PB03, PB04, PB05, PB06, PB07, PB08, PB09, PB10, PB11, an intensity signal 150 and a hysteresis module 512. The connecting port P30 is electrically connected to the control output node NMCU of the radio frequency processing module 400. The connecting port PGND is electrically connected to the ground voltage. The connecting port PVDD is electrically connected to the power supply voltage VDD. The connecting port PCTL1 is electrically connected to the automatic gain control input node NVin. The connecting ports PB00-PB11 are electrically connected to the displaying unit 600b. The intensity signal 150 corresponds to the signals of the connecting ports PB00-PB11. The hysteresis module 512 is configured to perform hysteresis operation for the detected signal 140 to generate the intensity signal 150 and an automatic gain control signal 160. The hysteresis module 512 processes the detected signal 140 by a firmware algorithm. The intensity signal 150 may be configured to control the displaying unit 600b via the connecting ports PB00-PB11. The automatic gain control signal 160 is transmitted to the automatic gain control circuit 430 via the connecting port PCTL1. The hysteresis module 512 with digital type of the present disclosure is configured to perform hysteresis operation. The hysteresis module 512 can keep the intensity signal 150 and the automatic gain control signal 160 in a constant state, thereby not only eliminating the flickering of the displaying unit 600b, but also avoiding unnecessary switching of the switch 440 of the radio frequency processing module 400 in a short period of time (It is because the switch 440 is switched according to the automatic gain control signal 160).

The displaying unit 600b includes a plurality of light emitters DB0, DB1, DB2, DB3, DB4, DB5, DB6, DB7, DB8, DB9, DB10 and a plurality of resistors RB00, RB01, RB02, RB03, RB04, RB05, RB06, RB07, RB08, RB09, RB10, RB11. The resistors RB00-RB11 are electrically connected between the connecting ports PB00-PB11 and the light emitters DB0-DB10. The light emitters DB0-DB10 are turned on or off according to the intensity signal 150, so that the light emitters DB0-DB10 have a lighting number. In response to determining that at least one of the light emitters DB0-DB10 (e.g., the light emitter DB0) is turned on, the at least one of the light emitters DB0-DB10 emits one of a plurality of color lights. A combination of the lighting number and the one of the color lights is positively correlated with an intensity value of the intensity signal 150. In detail, the light emitter DB0 is a two color light-emitting diode (LED), and the color lights include a green light, a red light and a yellow light. The yellow light is formed by mixing of the green light and the red light. The light emitters DB1-DB10 are single color LEDs, and all emit the white light when being turned on. The lighting number represents the number of at least part of the light emitters DB0-DB10 that are turned on.

The controlling unit 500b judges whether the intensity value of the intensity signal 150 is within one of a plurality of value intervals. In response to determining that the intensity value of the intensity signal 150 is within the one of the value intervals, at least one of the light emitters DB0-DB10 is turned on. The lighting number is positively correlated with the intensity value. For example, in FIG. 10, when the lighting status LS1 (the intensity signal 150 is a weaker signal) occurs, the number of the light emitters DB0-DB3 that are turned on is 4. The light emitter DB0 emits the red light. The light emitters DB1-DB3 all emit the white light, and the light emitters DB4-DB10 are turned off and do not light up. When the lighting status LS2 (the intensity signal 150 is a weak signal) occurs, the number of the light emitters DB0-DB5 that are turned on is 6. The light emitter DB0 emits the yellow light. The light emitters DB1-DB5 all emit the white light, and the light emitters DB6-DB10 are turned off and do not light up. When the lighting status LS3 (the intensity signal 150 is a normal signal) occurs, the number of the light emitters DB0-DB7 that are turned on is 8. The light emitter DB0 emits the green light. The light emitters DB1-DB7 all emit the white light, and the light emitters DB8-DB10 are turned off and do not light up.

Figure 11:
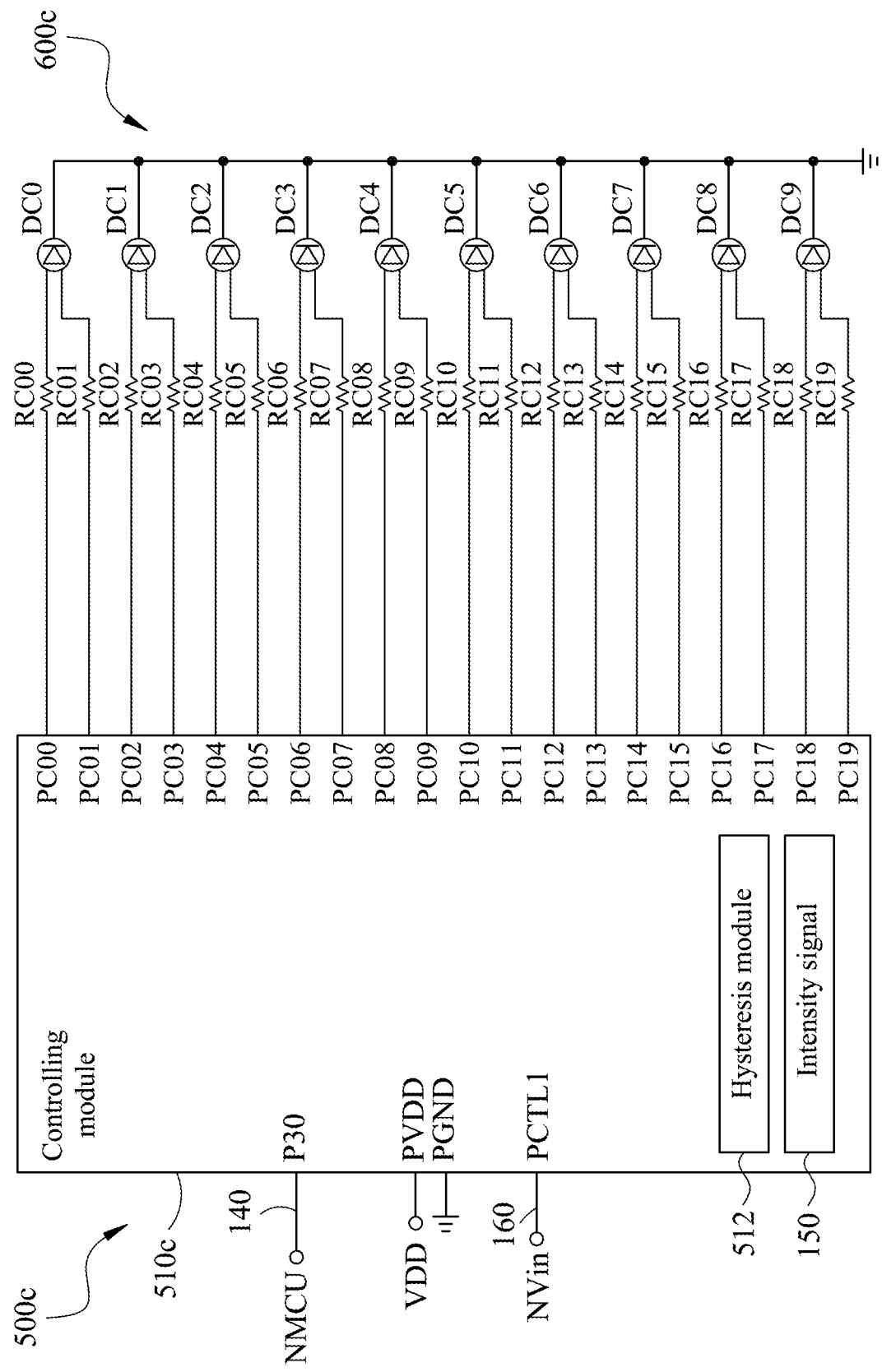
FIG. 11 shows a schematic view of a controlling unit and a displaying unit of a radio frequency receiving device with automatic gain control according to a fifth embodiment of the present disclosure.
Figure 12:
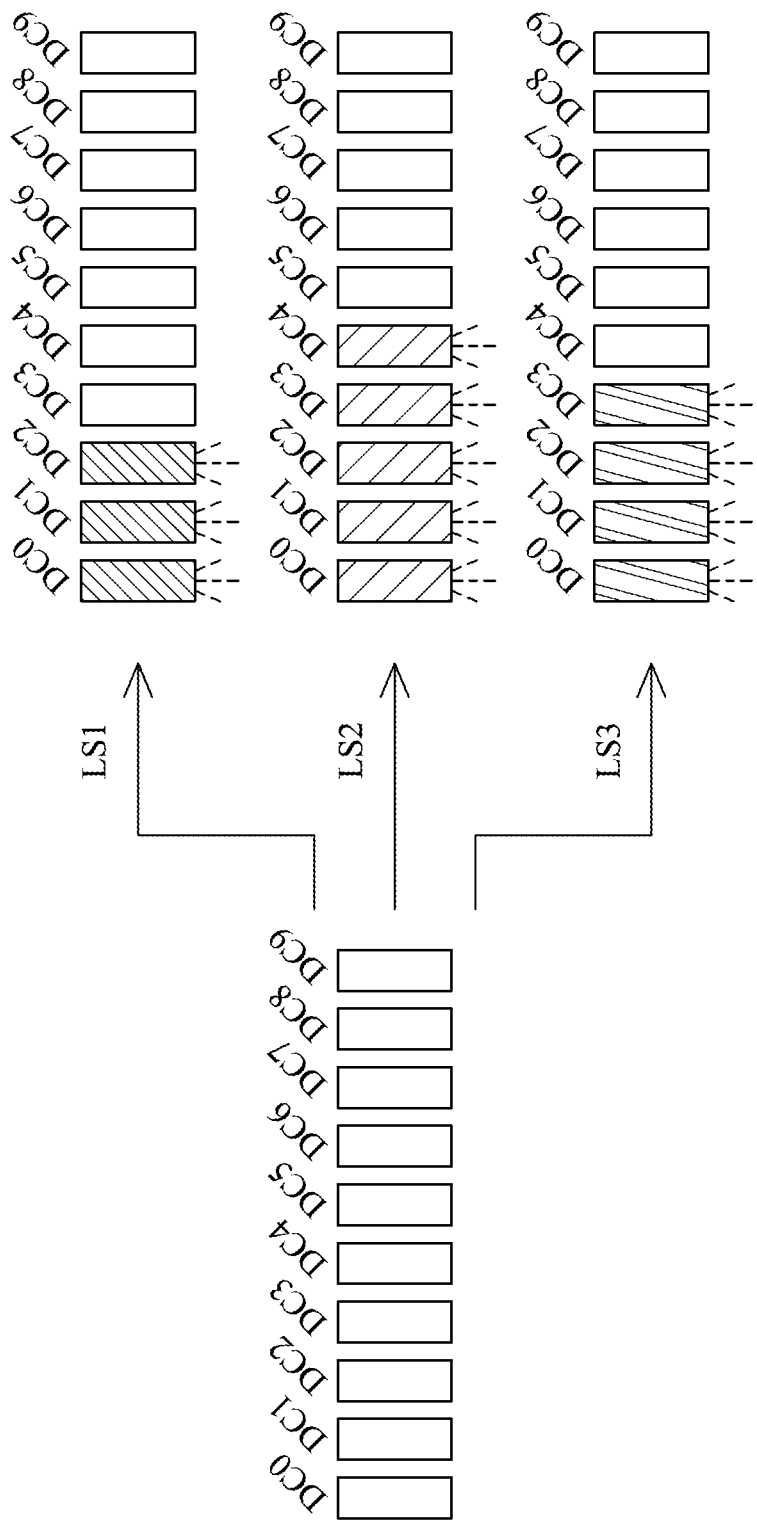
FIG. 12 shows a schematic view of a plurality of lighting statuses of the displaying unit of FIG. 11.

Please refer to FIGS. 1, 2, 11 and 12. FIG. 11 shows a schematic view of a controlling unit 500c and a displaying unit 600c of a radio frequency receiving device with automatic gain control according to a fifth embodiment of the present disclosure. FIG. 12 shows a schematic view of a plurality of lighting statuses LS1, LS2, LS3 of the displaying unit 600c of FIG. 11. The controlling unit 500c is connected to the radio frequency processing module 400 and includes a controlling module 510c. The controlling module 510c includes a plurality of connecting ports P30, PGND, PVDD, PCTL1, PC00, PC01, PC02, PC03, PC04, PC05, PC06, PC07, PC08, PC09, PC10, PC11, PC12, PC13, PC14, PC15, PC16, PC17, PC18, PC19, an intensity signal 150 and a hysteresis module 512. The connecting ports P30, PGND, PVDD, PCTL1 are the same as the connecting ports P30, PGND, PVDD, PCTL1 in FIG. 9. The connecting ports PC00-PC19 are electrically connected to the displaying unit 600c. The intensity signal 150 corresponds to the signals of the connecting ports PC00-PC19. In other words, the intensity signal 150 may be configured to control the displaying unit 600c via the connecting ports PC00-PC19. The effect of the hysteresis module 512 is the same as the effect of the hysteresis module 512 in FIG. 9, and will not be described here again.

The displaying unit 600c includes a plurality of light emitters DC0, DC1, DC2, DC3, DC4, DC5, DC6, DC7, DC8, DC9 and a plurality of resistors RC00, RC01, RC02, RC03, RC04, RC05, RC06, RC07, RC08, RC09, RC10, RC11, RC12, RC13, RC14, RC15, RC16, RC17, RC18, RC19. The resistors RC00-RC19 are electrically connected between the connecting ports PC00-PC19 and the light emitters DC0-DC9. The light emitters DC0-DC9 are turned on or off according to the intensity signal 150, so that the light emitters DC0-DC9 have a lighting number. In response to determining that each of the light emitters DC0-DC9 is turned on, the each of the light emitters DC0-DC9 emits one of a plurality of color lights. A combination of the lighting number and the one of the color lights is positively correlated with an intensity value of the intensity signal 150. In detail, each of the light emitters DC0-DC9 is a two color LED, and the color lights include a green light, a red light and a yellow light. The yellow light is formed by mixing of the green light and the red light. The lighting number represents the number of at least part of the light emitters DC0-DC9 that are turned on. The at least part of the light emitters DC0-DC9 that are turned on emit the same color light when being turned on. The number of the light emitters and the resistors of the present disclosure can be adjusted according to requirements, and the present disclosure is not limited thereto.

The controlling unit 500c judges whether the intensity value of the intensity signal 150 is within one of a plurality of value intervals. In response to determining that the intensity value of the intensity signal 150 is within the one of the value intervals, at least one of the light emitters DC0-DC9 is turned on to emit one of the green light, the red light and the yellow light. The lighting number is positively correlated with the intensity value. For example, in FIG. 12, when the lighting status LS1 (the intensity signal 150 is a weaker signal) occurs, the number of the light emitters DC0-DC2 that are turned on is 3. The light emitters DC0-DC2 emit the same red light. The light emitters DC3-DC9 are turned off and do not light up. When the lighting status LS2 (the intensity signal 150 is a weak signal) occurs, the number of the light emitters DC0-DC4 that are turned on is 5. The light emitters DC0-DC4 emit the same yellow light. The light emitters DC5-DC9 are turned off and do not light up. When the lighting status LS3 (the intensity signal 150 is a normal signal) occurs, the number of the light emitters DC0-DC3 that are turned on is 4. The light emitters DC0-DC3 emit the same green light. The light emitters DC4-DC9 are turned off and do not light up. In addition, the value intervals include a first value interval, a second value interval and a third value interval. Values from small to large are the first value interval, the second value interval and the third value interval in sequence. In response to determining that the intensity value of the intensity signal 150 is within the first value interval (such as the lighting status LS1), at least one of the light emitters DC0-DC9 is turned on to emit the red light. In response to determining that the intensity value of the intensity signal 150 is within the second value interval (such as the lighting status LS2), at least one of the light emitters DC0-DC9 is turned on to emit the yellow light. In response to determining that the intensity value of the intensity signal 150 is within the third value interval (such as the lighting status LS3), at least one of the light emitters DC0-DC9 is turned on to emit the green light.

Figure 13:
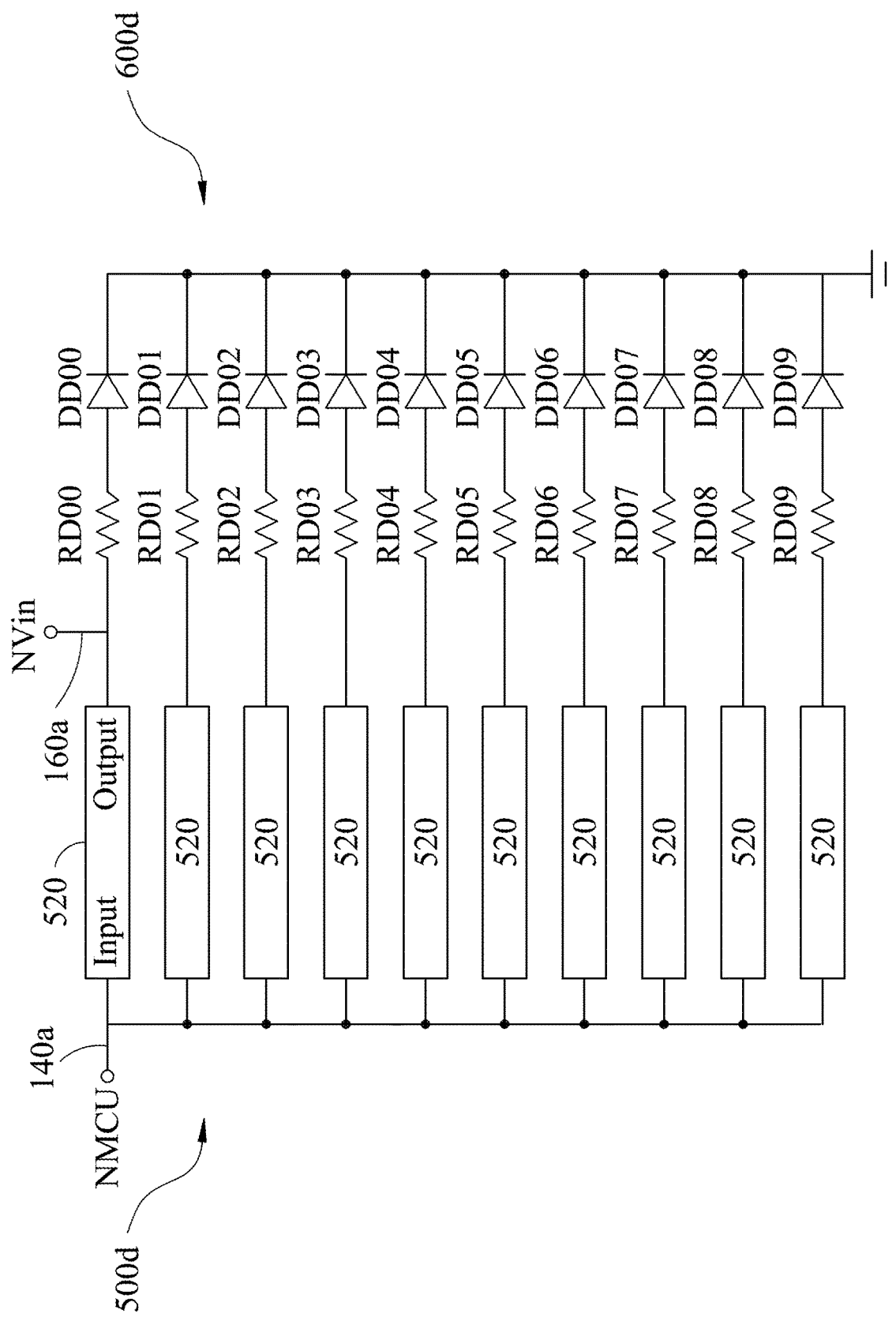
FIG. 13 shows a schematic view of a controlling unit and a displaying unit of a radio frequency receiving device with automatic gain control according to a sixth embodiment of the present disclosure.
Figure 14:
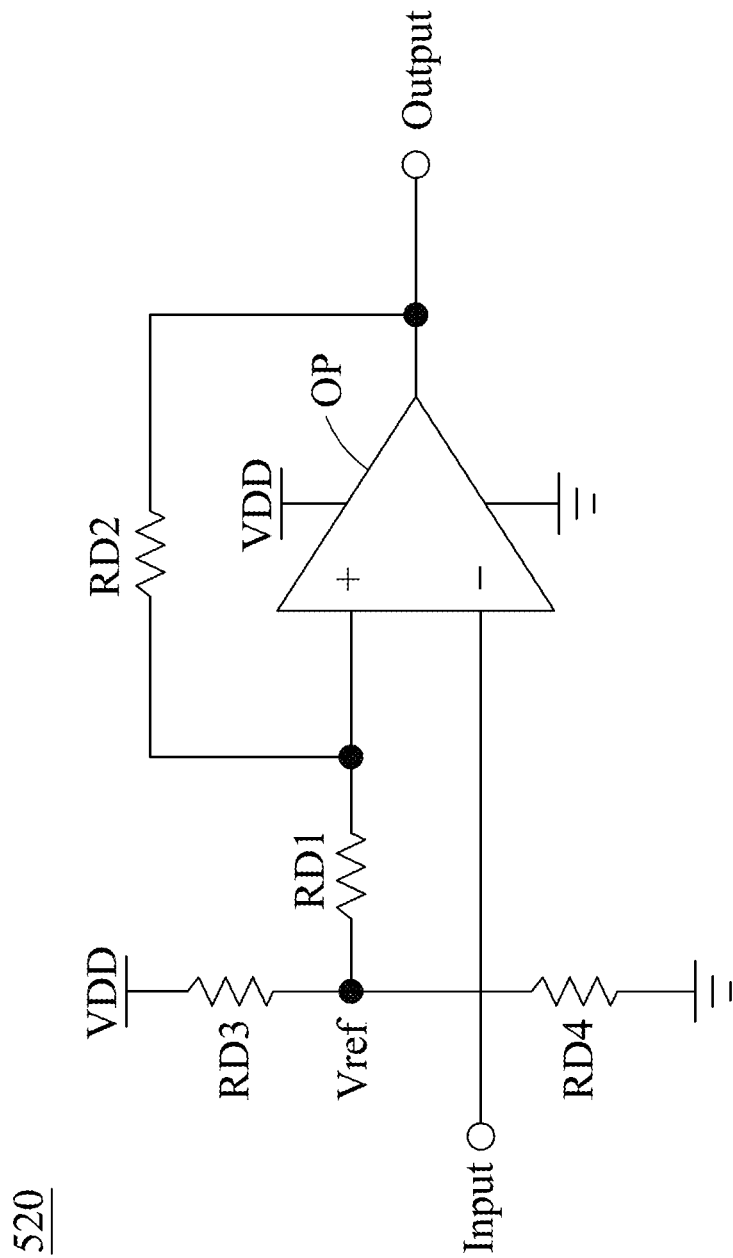
FIG. 14 shows a schematic view of one of a plurality of operational amplifier circuits with hysteresis operation of the controlling unit of FIG. 13.

Please refer to FIGS. 5, 13 and 14. FIG. 13 shows a schematic view of a controlling unit 500d and a displaying unit 600d of a radio frequency receiving device with automatic gain control according to a sixth embodiment of the present disclosure. FIG. 14 shows a schematic view of one of a plurality of operational amplifier circuits 520 with hysteresis operation of the controlling unit 500d of FIG. 13. The controlling unit 500d is connected to the radio frequency processing module 400a and includes the operational amplifier circuits 520. Each of the operational amplifier circuits 520 includes an operational amplifier OP, a plurality of resistors RD1, RD2, RD3, RD4 and a plurality of connecting ports Input, Output. The operational amplifier OP is electrically connected to the resistors RD1, RD2. The resistor RD1 is electrically connected to the resistors RD3, RD4. A voltage at a connecting point of the resistors RD1, RD3, RD4 is a reference voltage Vref. The connecting ports Input, Output are electrically connected to the radio frequency processing module 400a and the displaying unit 600d, respectively. The controlling unit 500a compares the detected signal 140a with a plurality of reference voltages Vref of the operational amplifier circuits 520 to generate a plurality of intensity signals, and one of the intensity signals is an automatic gain control signal 160a. Moreover, the displaying unit 600d is electrically connected to the controlling unit 500d. The displaying unit 600 includes a plurality of light emitters DD00, DD01, DD02, DD03, DD04, DD05, DD06, DD07, DD08, DD09 and a plurality of resistors RD00, RD01, RD02, RD03, RD04, RD05, RD06, RD07, RD08, RD09. The controlling unit 500d transmits the automatic gain control signal 160a to the automatic gain control circuit 430, so that the automatic gain control circuit 430 controls the radio frequency output signal 130a of the amplifier 410 according to the automatic gain control signal 160a. The controlling unit 500d transmits the intensity signals to the displaying unit 600d, so that the displaying unit 600d turns on or off the light emitters DD00-DD09 according to the intensity signals. The operational amplifier circuits 520 with analog type of the present disclosure are configured to perform hysteresis operation. The operational amplifier circuits 520 can keep the intensity signals and the automatic gain control signal 160a in a constant state, thereby not only eliminating the flickering of the displaying unit 600d, but also avoiding unnecessary switching of the switch 440 of the radio frequency processing module 400a in a short period of time.

According to the aforementioned embodiments and examples, the advantages of the present disclosure are described as follows.

1. The radio frequency receiving device with automatic gain control and the signal processing method thereof of the present disclosure can improve the sensitivity and dynamic range of the display of the signal level detection by automatic gain control, and control the radio frequency output signal 130a at an appropriate level, and avoid a signal overload problem of a conventional radio frequency receiving device.

2. Regardless of the controlling unit with digital type or analog type, the automatic gain control signal and the at least one intensity signal can be simultaneously generated to realize the adjustment of the radio frequency output signal and the intensity display of the radio frequency signal, respectively.

3. The radio frequency receiving device with automatic gain control of the present disclosure has high sensitivity, high dynamic range and high gain, thus greatly improving the convenience and success rate of reception of terrestrial digital television broadcasting.

4. The hysteresis module with digital type and the operational amplifier circuits with analog type of the present disclosure are both configured to perform hysteresis operation and can keep the intensity signals and the automatic gain control signal in a constant state, thereby not only eliminating the flickering of the displaying unit, but also avoiding unnecessary switching of the switch of the radio frequency processing module in a short period of time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A radio frequency receiving device with automatic gain control, comprising:
    a filtering module configured to filter a radio frequency signal to generate a filtered signal;
    a radio frequency processing module, comprising:
        an amplifier electrically connected to the filtering module and receiving the filtered signal, wherein the amplifier amplifies the filtered signal to generate a radio frequency output signal;
        a detecting circuit electrically connected to the filtering module and receiving the filtered signal, wherein the detecting circuit detects the filtered signal to generate a detected signal; and
        an automatic gain control circuit electrically connected to the amplifier;
    a controlling unit electrically connected to the detecting circuit and the automatic gain control circuit and receiving the detected signal, wherein the controlling unit generates at least one intensity signal according to the detected signal, and judges the detected signal to generate an automatic gain control signal; and
    a displaying unit electrically connected to the controlling unit and comprising a plurality of light emitters;
    wherein the controlling unit transmits the automatic gain control signal to the automatic gain control circuit, so that the automatic gain control circuit controls the radio frequency output signal of the amplifier according to the automatic gain control signal;
    wherein the controlling unit transmits the at least one intensity signal to the displaying unit, so that the displaying unit turns on or off the plurality of light emitters according to the at least one intensity signal.

2. The radio frequency receiving device with automatic gain control of claim 1, wherein the displaying unit further comprises:
    at least one light emitting element electrically connected to the controlling unit, wherein the controlling unit turns on or off the at least one light emitting element according to the automatic gain control signal.

3. The radio frequency receiving device with automatic gain control of claim 1, wherein the controlling unit judges whether the detected signal is greater than a predetermined detection threshold to generate the automatic gain control signal;
    wherein in response to determining that the detected signal is greater than the predetermined detection threshold, the automatic gain control signal is a high voltage level;
    wherein in response to determining that the detected signal is smaller than or equal to the predetermined detection threshold, the automatic gain control signal is a low voltage level.

4. The radio frequency receiving device with automatic gain control of claim 3, wherein the displaying unit further comprises:
    a first light emitting element electrically connected to the controlling unit; and
    a second light emitting element electrically connected to the controlling unit, wherein the controlling unit simultaneously turns on or off the first light emitting element and the second light emitting element according to the automatic gain control signal;
    wherein in response to determining that the automatic gain control signal is the high voltage level, the first light emitting element is turned off, and the second light emitting element is turned on;
    wherein in response to determining that the automatic gain control signal is the low voltage level, the first light emitting element is turned on, and the second light emitting element is turned off.

5. The radio frequency receiving device with automatic gain control of claim 1, wherein the controlling unit judges whether an intensity value of the at least one intensity signal is within one of a plurality of value intervals;
    wherein in response to determining that the intensity value of the at least one intensity signal is within the one of the value intervals, at least one of the plurality of light emitters is turned on.

6. The radio frequency receiving device with automatic gain control of claim 5, wherein the plurality of light emitters comprise a first light emitter, a second light emitter, a third light emitter and a fourth light emitter, the value intervals comprise a first value interval, a second value interval, a third value interval and a fourth value interval, and values from small to large are the first value interval, the second value interval, the third value interval and the fourth value interval in sequence;
    wherein in response to determining that the intensity value of the at least one intensity signal is within the first value interval, the first light emitter is turned on, and the second light emitter, the third light emitter and the fourth light emitter are turned off;
    wherein in response to determining that the intensity value of the at least one intensity signal is within the second value interval, the first light emitter and the second light emitter are turned on, and the third light emitter and the fourth light emitter are turned off;
    wherein in response to determining that the intensity value of the at least one intensity signal is within the third value interval, the first light emitter, the second light emitter and the third light emitter are turned on, and the fourth light emitter is turned off;

wherein in response to determining that the intensity value of the at least one intensity signal is within the fourth value interval, the first light emitter, the second light emitter, the third light emitter and the fourth light emitter are turned on.

7. The radio frequency receiving device with automatic gain control of claim 1, wherein the radio frequency processing module further comprises:
a switch electrically connected between an input terminal and an output terminal of the amplifier, wherein the switch is turned on or off according to the automatic gain control signal, so that the filtered signal is passed through one of the switch and the amplifier.

8. The radio frequency receiving device with automatic gain control of claim 1, wherein a number of the at least one intensity signal is plural, the controlling unit compares the detected signal with a plurality of reference voltages to generate the intensity signals, and one of the intensity signals is the automatic gain control signal.

9. The radio frequency receiving device with automatic gain control of claim 8, wherein the controlling unit judges whether the detected signal is greater than one of the reference voltages to generate the automatic gain control signal;
wherein in response to determining that the detected signal is greater than the one of the reference voltages, the automatic gain control signal is a high voltage level;
wherein in response to determining that the detected signal is smaller than or equal to the one of the reference voltages, the automatic gain control signal is a low voltage level.

10. The radio frequency receiving device with automatic gain control of claim 8, wherein the controlling unit comprises:
a plurality of operational amplifiers electrically connected to the detecting circuit and receiving the detected signal, wherein one of the operational amplifiers is electrically connected to the automatic gain control circuit, the operational amplifiers are electrically connected to the plurality of light emitters, respectively, and each of the operational amplifiers compares the detected signal with each of the reference voltages to generate each of the intensity signals, so that the plurality of light emitters are turned on or off according to the intensity signals, respectively.

11. The radio frequency receiving device with automatic gain control of claim 8, wherein the radio frequency processing module further comprises:
a switch electrically connected between an input terminal and an output terminal of the amplifier, wherein the switch is turned on or off according to the automatic gain control signal, so that the filtered signal is passed through one of the switch and the amplifier.

12. The radio frequency receiving device with automatic gain control of claim 8, wherein the plurality of light emitters are turned on or off according to the intensity signals, so that the plurality of light emitters have a lighting number, in response to determining that at least one of the plurality of light emitters is turned on, the at least one of the plurality of light emitters emits one of a plurality of color lights, and a combination of the lighting number and the one of the color lights is positively correlated with an intensity value of the intensity signals.

13. A signal processing method of a radio frequency receiving device with automatic gain control, comprising:
performing a filtering step to configure a filtering module to filter a radio frequency signal to generate a filtered signal;
performing an amplifying step to configure an amplifier to amplify the filtered signal to generate a radio frequency output signal;
performing a detecting step to configure a detecting circuit to detect the filtered signal to generate a detected signal;
performing an operation controlling step to configure a controlling unit to judge the detected signal to generate an automatic gain control signal, and generate at least one intensity signal according to the detected signal;
performing an automatic gain controlling step to configure an automatic gain control circuit to control the radio frequency output signal of the amplifier according to the automatic gain control signal; and
performing a displaying step to configure a displaying unit to turn on or off a plurality of light emitters according to the at least one intensity signal.

14. The signal processing method of the radio frequency receiving device with automatic gain control of claim 13, wherein the controlling unit judges whether the detected signal is greater than a predetermined detection threshold to generate the automatic gain control signal;
wherein in response to determining that the detected signal is greater than the predetermined detection threshold, the automatic gain control signal is a high voltage level;
wherein in response to determining that the detected signal is smaller than or equal to the predetermined detection threshold, the automatic gain control signal is a low voltage level.

* * * * *